US009051188B2

(12) United States Patent
Hansen et al.

(10) Patent No.: US 9,051,188 B2
(45) Date of Patent: Jun. 9, 2015

(54) SODIUM BICARBONATE PRODUCT WITH EXCELLENT FLOWABILITY AND ITS METHOD OF MANUFACTURE

(75) Inventors: David M. Hansen, Green River, WY (US); Todd Wilson, Kingwood, TX (US); Jessica A. Mote, Kaycee, WY (US); James D. Phillip, Green River, WY (US)

(73) Assignee: SOLVAY CHEMICALS, INC., Houston, TX (US)

( * ) Notice: Subject to any disclaimer, the term of this patent is extended or adjusted under 35 U.S.C. 154(b) by 0 days.

(21) Appl. No.: 14/119,520

(22) PCT Filed: Jun. 1, 2012

(86) PCT No.: PCT/EP2012/060383
§ 371 (c)(1),
(2), (4) Date: Nov. 22, 2013

(87) PCT Pub. No.: WO2012/164072
PCT Pub. Date: Dec. 6, 2012

(65) Prior Publication Data
US 2014/0113135 A1 Apr. 24, 2014

Related U.S. Application Data

(60) Provisional application No. 61/492,373, filed on Jun. 1, 2011, provisional application No. 61/497,901, filed on Jun. 16, 2011.

(30) Foreign Application Priority Data

Dec. 1, 2011 (EP) ..................................... 11191616

(51) Int. Cl.
| | | |
|---|---|---|
| *C01D 7/10* | (2006.01) | |
| *C01D 7/00* | (2006.01) | |
| *B01D 53/40* | (2006.01) | |
| *B01D 53/50* | (2006.01) | |
| *B01D 53/62* | (2006.01) | |
| *B01J 20/04* | (2006.01) | |
| *B01J 20/28* | (2006.01) | |
| *B01D 53/02* | (2006.01) | |

(52) U.S. Cl.
CPC ............. *C01D 7/10* (2013.01); *Y10T 428/2982* (2015.01); *B01D 53/40* (2013.01); *B01D 53/508* (2013.01); *B01D 53/62* (2013.01); *B01D 2251/304* (2013.01); *B01D 2251/606* (2013.01); *B01D 2257/2045* (2013.01); *B01D 2257/302* (2013.01); *B01D 2257/504* (2013.01); *C01P 2004/03* (2013.01); *C01P 2004/30* (2013.01); *C01P 2004/32* (2013.01); *C01P 2004/54* (2013.01); *C01P 2004/60* (2013.01); *C01P 2004/61* (2013.01); *C01P 2006/20* (2013.01); *C01P 2006/80* (2013.01); *Y02C 10/04* (2013.01); *B01J 20/043* (2013.01); *B01J 20/28004* (2013.01); *B01J 20/28011* (2013.01); *B01J 20/28019* (2013.01); *B01D 53/02* (2013.01); *C01D 7/00* (2013.01)

(58) Field of Classification Search
USPC .......................................... 428/402; 423/422
IPC ....... C01D 7/10,7/00; B01D 53/02; B01J 20/04
See application file for complete search history.

(56) References Cited

U.S. PATENT DOCUMENTS

| | | | |
|---|---|---|---|
| 3,852,427 A | 12/1974 | Hoffman et al. | |
| 3,855,397 A | 12/1974 | Hoffman et al. | |
| 3,855,398 A | 12/1974 | Hoffman et al. | |
| 4,039,617 A * | 8/1977 | Kuo | ............................... 423/186 |
| 4,547,362 A | 10/1985 | Winston et al. | |
| 5,071,558 A | 12/1991 | Itob | |
| 5,290,322 A | 3/1994 | Breton et al. | |
| 5,422,087 A | 6/1995 | Lajoie | |
| 5,482,701 A | 1/1996 | Winston | |
| 2002/0172713 A1 | 11/2002 | Einziger et al. | |
| 2003/0017099 A1* | 1/2003 | Kurtz | ............................ 423/422 |
| 2007/0286790 A1 | 12/2007 | Tinson et al. | |

FOREIGN PATENT DOCUMENTS

| | | | |
|---|---|---|---|
| WO | WO2009/138403 | * | 11/2009 |
| WO | WO 2009138403 A1 | | 11/2009 |

OTHER PUBLICATIONS

JF Nunes et al,: "Fluid dynamics and coating of sodium bicarbonate..." Chemical Engineering and Processing, vol. 52, Dec. 13, 2011, pp. 34-40.*
Nunes, J.F. et al.,—"Fluid dynamics and coating of sodium bicarbonate in a vibrofluidized bed", Chemical Engineering and Processing: Process Intensification (2012) vol. 52, pp. 34-40—7 pages.

* cited by examiner

*Primary Examiner* — Leszek Kiliman
(74) *Attorney, Agent, or Firm* — Beatrice C. Ortego (57) ABSTRACT

A particulate sodium bicarbonate product with an excellent flowability characterized by an angle of repose less than 30 degrees. An angle of repose of less than 27.5 is particularly good. The product is preferably in the form of ovoid or spherical particles, in that the particles have a mean axial ratio of at least 0.5. In some embodiments, the sodium bicarbonate product has a smooth particle surface in which less than 75% of the particle surface is covered with spikes. The particles may have a mean diameter $D_{50}$ of at least 75 microns but less than 300 microns. The particulate sodium bicarbonate product comprises inorganic and organic impurities embedded in its polycrystalline structure, for example at least 75 ppm TOC; or at least 30 ppm Ca; or from 1 to 18 ppm Mg; or more than 0.6 g/kg NaCl; and/or from 100 to less than 500 ppm Si. A process for manufacturing such product, and its use for the treatment of pollutants in gases such as removal of acid gas.

19 Claims, 3 Drawing Sheets

SODIUM BICARBONATE PRODUCT WITH EXCELLENT FLOWABILITY AND ITS METHOD OF MANUFACTURE

CROSS-REFERENCE TO RELATED APPLICATIONS

The present application is a U.S. national stage entry under 35 U.S.C. §371 of International Application No. PCT/EP2012/060383 Jun. 1, 2012, which claims priority to U.S. provisional application No. 61/492,373 filed Jun. 1, 2011, to U.S. provisional application No. 61/497,901 filed Jun. 16, 2011, and to European application No. 11191616.9 filed Dec. 1, 2011, the whole content of each of these applications being incorporated herein by reference for all purposes.

TECHNICAL FIELD OF THE INVENTION

This invention relates to a sodium bicarbonate product having a specific morphology and/or excellent flowability and to a process for obtaining it from sodium carbonate liquor derived from trona ore.

BACKGROUND OF THE INVENTION

Trona ore is a mineral that contains about 90-95% sodium sesquicarbonate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl) which covers approximately 2,600 km². The major trona beds range in size from less than 428 km² to at least 1,870 km². By conservative estimates, these major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE A

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate is one of the largest volume alkali commodities made in the United States. In 1992, trona-based sodium carbonate from Wyoming comprised about 90% of the total U.S. soda ash production. Sodium carbonate finds major use in the glass-making industry and for the production of baking soda, detergents and paper products.

A common method to produce sodium carbonate from trona ore is known as the "monohydrate process". In that process, crushed trona ore is calcined (i.e., heated) into crude sodium carbonate which is then dissolved in water. The resulting water solution is purified and fed to a crystallizer where pure sodium carbonate monohydrate crystals are crystallized. The monohydrate crystals are separated from the mother liquor and then dried into anhydrous sodium carbonate. However, the soluble impurities contained in the trona ore tend to accumulate into the crystallizer. To avoid build up of impurities, the mother liquor must be purged. The purge liquor, which represents important quantities for industrial monohydrate plants, is commonly sent to evaporative ponds. The significant quantity of alkali which is contained in the purge liquor is consequently lost. Moreover, the stocking of large quantities of purge liquors in evaporative ponds raise environmental problems, because of the scarce availability of new areas for stocking.

On the other side, sodium bicarbonate is a product with a wide range of interesting properties and a very wide range of applications from high tech ingredients for the pharmaceutical industry to the human food and animal feed, and to the use in flue gas treatment. In flue gas treatment sodium bicarbonate is most likely among the most efficient chemicals for the removal of a wide range of pollutants (most notably the acidic ones such as HCl and sulfur oxides), and its use is limited only by the competition of less efficient but much cheaper chemicals such as lime or even limestone.

The production of sodium bicarbonate is currently almost entirely made by the carbonation of sodium carbonate. In Europe, the carbonation is usually performed in situ in the soda ash plants from $CO_2$ coproduced during the production of soda ash (mainly the $CO_2$ generation in the lime kilns). In the United States, the carbonation is usually made in separate plants which purchase independently the soda ash and the $CO_2$ and combine them.

Because of the nature of this most important process for the bicarbonate production, the price for bicarbonate is higher than the price of the soda ash. With such economics the uses of bicarbonate will always be limited by the competition of cheaper substitutes, most notably in the flue gas treatment.

US2003/0017099 discloses a process for the joint production of sodium carbonate and bicarbonate, according to which solid trona is dissolved in water and the resulting water solution is fed into a monohydrate crystallizer in order to produce sodium carbonate. The purge liquor is introduced into a decahydrate crystallizer and the decahydrate crystals converted into sodium bicarbonate. It has been observed that this process is not efficient when the purge liquor, depending on the trona source, contains high levels of impurities. In particular, the sodium chloride content of the trona ore can vary depending on the precise trona vein which is exploited. High levels of sodium chloride in the purge liquor prevent smooth crystallization of decahydrate.

SUMMARY OF THE INVENTION

The invention aims on one side at reducing the amount of alkali lost in the evaporative ponds and on the other side at producing low-cost sodium bicarbonate from trona, and particularly from a crystallizer purge stream of a soda ash plant, in a simple and inexpensive way with an excellent flowability and/or surface characteristics, thereby opening new applications for the resulting particulate sodium bicarbonate product where dispensing and/or dispersing are important qualities for ease of use.

A first aspect of the present invention relates to a particulate sodium bicarbonate product.

A first embodiment of the first aspect of the invention relates to a particulate sodium bicarbonate product with an excellent flowability which is characterized by a low angle of repose, e.g., less than 30 degrees. The angle of repose is preferably 29 degrees or less, or 28 degrees or less, or even 27.5 degrees or less.

A second embodiment of the first aspect of the invention relates to a sodium bicarbonate product of new morphology in the form of ovoid or spherical particles, which differs from the known sodium bicarbonate products, in that the present particulate sodium bicarbonate product is not formed from particles of larger size, such as by grinding and/or milling, and/or in that the present particulate sodium bicarbonate product is not formed by removing fines and/or particles of large size, such as by sieving.

Within the framework of the first aspect of the invention, the ovoid or spherical particles are particles which have an essentially curved surface free from sharp edges. They generally have a rotation profile which can vary from a lens to an ideal sphere. According to such embodiment, a sodium bicarbonate product according to the present invention is in the form of ovoid particles having a mean axial ratio of at least 0.5, preferably greater than 0.7, more preferably greater than 0.8, the mean axial ratio being defined by the relationship:

$$\frac{\sum_{i=1}^{i=n} a_i : b_i}{n}$$

where $a_i$ and $b_i$ respectively denote the smallest and the largest axial dimension of a particle, n denotes the number of particles in a representative sample of particles of sodium bicarbonate. A mean axial ratio of between 0.75 and 0.98 or between 0.8 and 0.95 is particularly preferred. Approximately spherical particles are most preferred.

In the second embodiment of the first aspect of the invention, the ovoid or spherical particles are preferably monolithic. 'Monolithic particle' is understood to denote a particle formed from a non-agglomerated unit block of sodium bicarbonate. According to the present invention, the monolithic particles are advantageously crystalline. Each particle is preferably a polycrystal.

In a variant of the second embodiment of the first aspect of the invention, the sodium bicarbonate particles have a smooth particle surface. That is to say, less than 75% of the particle surface, preferably less than 50% of the particle surface, is covered with spikes.

According to a third embodiment of the first aspect of the invention, which is particularly advantageous, a particulate sodium bicarbonate product according to the present invention is in the form of particles having a mean diameter '$D_{50}$' of less than 300 microns. The mean diameter $D_{50}$ is preferably 275 microns or less, or 260 microns or less, or even 250 microns or less. The mean diameter $D_{50}$ may be at least 75 microns, or at least 80 microns, or at least 100 microns, or at least 125 microns. The mean diameter being defined as $D_{50}$ is the particle diameter such that half of the particles, in weight, have a diameter lower than the specified value. For non-spherical particles, the mean diameter is the equivalent size which is six times the value of the volume of the particles divided by its external area.

The optimum mean diameter of the particles forming the particulate sodium bicarbonate product according to this third embodiment depends on the use for which it is intended. Accordingly, a particulate sodium bicarbonate product which is very suitable in the majority of applications in the present invention may have a mean particle diameter $D_{50}$ of between 80 and 300 microns, or between 100 and 250 microns, or between 120 and 240 microns. Preferred narrower ranges for $D_{50}$ may be from 130 to 190 microns or from 200 to 240 microns.

In a variant of the third embodiment in which $D_X$ is the diameter value such that x percent of the particles have a diameter lower than the value, the sodium bicarbonate product may have a $D_{10}$ diameter between 25 and 100 microns, preferably between 40 and 100 µm. Additionally or alternatively, the sodium bicarbonate product may have a $D_{90}$ diameter between 175 and 500 µm, preferably between 200 and 475 µm, more preferably between 250 and 450 µm.

In a fourth embodiment, the particulate sodium bicarbonate product in the form of a powder contains a small weight fraction of fines, that is to say, of particles of less than 45 microns, such as those passing a size of U.S. mesh size of 325 (44 microns). In particular, preferably less than 10% by weight, more preferably less than 8% by weight, most preferably less than 5% by weight of the particles in the sodium bicarbonate product have a size of less than 45 microns (e.g., less than 10% by weight of the product pass through a US mesh size of 325).

A fifth embodiment of the first aspect of the invention relates to a particulate sodium bicarbonate product which contains organic impurities within its polycrystalline structure. The sodium bicarbonate particles may contain at least 75 ppm of Total Organic Carbon (TOC); more preferably at least 100 ppm TOC. Although more than 500 ppm TOC may be obtained, it is preferred that the sodium bicarbonate particles may contain at most 500 ppm of Total Organic Carbon (TOC); more preferably at most 400 ppm TOC. Preferred ranges of organic content inside the polycrystalline structure of the sodium bicarbonate particles may be more than 100 ppm TOC and at most 350 ppm TOC.

A sixth embodiment of the first aspect of the invention relates to a particulate sodium bicarbonate product which contains inorganic impurities within its polycrystalline structure. The particulate sodium bicarbonate product may contain magnesium in an amount of at most 18 ppm, or at most 15 ppm, or at most 13 ppm, or at most 12 ppm. Values of magnesium content in the sodium bicarbonate particles may be at least 1 ppm, or at least 3 ppm, or at least 4 ppm. A preferred range of Mg content inside the polycrystalline structure of the particulate sodium bicarbonate product may be from 4 to 18 ppm Mg, or from 4 to 12 ppm Mg, or from 7 to 18 ppm Mg.

According to this sixth embodiment, the particulate sodium bicarbonate product may contain calcium in an amount of at least 60 ppm, or at least 70 ppm. Values of calcium content in the sodium bicarbonate particles may be at most 200 ppm, or at most 180 ppm, or at most 150 ppm, or at most 125 ppm, or at most 115 ppm. Preferred ranges of Ca content inside the polycrystalline structure of the particulate sodium bicarbonate product may be from 30 to 200 ppm Ca, or from 50 to 180 ppm Ca, or from 70 to 110 ppm Ca.

According to this sixth embodiment, the particulate sodium bicarbonate product may contain silicon in the form of silica and/or silicates in an amount of at least 100 ppm Si, or at least 125 ppm Si, or at least 150 ppm Si. Values of Si content inside the polycrystalline structure of the sodium bicarbonate product may be less than 500 ppm Si, or at most 450 ppm Si, or at most 425 ppm Si. Preferred ranges of Si content inside the polycrystalline structure of the particulate sodium bicarbonate product may be from 125 to 400 ppm Si. The particulate sodium bicarbonate product should not contain discrete and separate particles of silica and/or silicates, or Silica and/or silicates should be embedded into the polycrystallline structure of the particles of the sodium bicarbonate product.

A seventh embodiment of the first aspect of the invention relates to a crystalline particulate sodium bicarbonate product in which the particles may contain more than 0.3 g/kg NaCl. A preferred range for NaCl content in the particles is from 0.6 to 2 g NaCl per kg of total weight (or 0.06-0.2 wt %).

An eighth embodiment of the first aspect of the invention relates to a crystalline particulate sodium bicarbonate product in which the particles may contain more than 0.3 g/kg $Na_2SO_4$. A preferred range for $Na_2SO_4$ content in the particles is from 0.3 to 2.2 g $Na_2SO_4$ per kg of total weight (or 0.03-0.22 wt %) or even from 0.4 to 1.3 g $Na_2SO_4$ per kg of total weight (or 0.04-0.13 wt %).

In a ninth embodiment according to the first aspect of the present invention, the sodium bicarbonate product may include any sub-combination or combinations of the features represented by two or more of the first to eighth embodiments or any variants thereof.

Optionally, in any one of the preceding embodiments, in any sub-combinations of preceding embodiments, or in all of the preceding embodiments according to the first aspect of the present invention, the sodium bicarbonate product is preferably free of one or more flow aid additives. For example, the sodium bicarbonate product may be essentially free of alkaline earth phosphorous-containing flow aid agent (such as tricalcium phosphate) and/or may be essentially free of a silica-based flow aid agent such as hydrophobic silica, silica gel, or nanosized silica.

A second aspect of the present invention relates to a process for the production of sodium bicarbonate utilizing, at least in part, a purge liquor exiting from a sodium carbonate crystallizer. The process comprises:
- dissolving a solid powder derived from sodium sesquicarbonate, having a mean particle diameter comprised between 0.1 and 10 mm in water to form an aqueous solution;
- introducing the resulting aqueous solution into a crystallizer, wherein a first water suspension comprising sodium carbonate crystals is produced;
- subjecting the first water suspension to a separation, in order to obtain crystals comprising sodium carbonate on the one hand and a mother liquor on the other hand;
- taking a part of the mother liquor out of the crystallizer as a purge liquor containing between 100 ppm Total Organic Carbon (TOC) and 1600 ppm in TOC; and
- putting at least a portion of the purge liquor into contact with a gas comprising carbon dioxide in the presence of an added alkaline earth metal salt, in order to produce a second water suspension comprising sodium bicarbonate crystals;
- separating particles containing said sodium bicarbonate crystals; and
- drying said particles to form the sodium bicarbonate product.

In preferred embodiments of the second aspect of the invention, the added alkaline earth metal salt comprises Ca, and calcium is added to reach an amount from 30 mg to 200 mg Ca per kg of sodium bicarbonate particles produced, preferably from 50 to 180 mg Ca per kg sodium bicarbonate particles produced, more preferably from 70 to 110 mg Ca per kg sodium bicarbonate particles produced.

The sodium bicarbonate product formed by the method according to the second aspect of the present invention is a particulate sodium bicarbonate product which contains organic impurities within its polycrystalline structure. The sodium bicarbonate particles may contain at least 75 ppm of Total Organic Carbon (TOC).

Additionally, in any one of the preceding embodiments, in any sub-combinations of preceding embodiments, or in all of the preceding embodiments according to the first and/or second aspects of the present invention, the sodium bicarbonate product has preferably not been subjected to a grinding or milling operation which would impact its granulation.

Additionally or alternatively, in any one of the preceding embodiments, in any sub-combinations of preceding embodiments, or in all of the preceding embodiments according to the first and/or second aspects of the present invention, the sodium bicarbonate product has preferably not been subjected to a sieving operation which would impact its granulation, that is to say not subjected to removing a portion of large particles (e.g., particles of more than 300 microns) and/or not subjected to removing a portion of fines (e.g., smaller particles of less than 45 microns).

Additionally or alternatively, the sodium bicarbonate product formed by the method according to the second aspect of the present invention may provide a particulate sodium bicarbonate product according to any one of the preceding embodiments, in any sub-combinations of preceding embodiments, or in all of the preceding embodiments according to the first aspect of the present invention.

A third aspect of the present invention relates to a reagent for treating a gas containing acid gas pollutants, preferably HCl and/or $SO_x$ wherein the reagent comprises a particulate sodium bicarbonate product.

A fourth aspect of the present invention relates to a process for treating a gas containing acid gas pollutants, preferably HCl and/or $SO_x$ comprising:
- injecting a reagent comprising a particulate sodium bicarbonate product in the gas;
- reacting at least a portion of the pollutants with the reagent; and
- separating the product of the reaction from the treated gas.

In the third and fourth aspects the present invention, the reagent comprises or consists of the particulate sodium bicarbonate product according to any one of the preceding embodiments, to any sub-combinations of preceding embodiments, or to all of the preceding embodiments according to the first aspect of the present invention, or the particulate sodium bicarbonate product which is formed by the method according to the second aspect of the present invention.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

A process according to one aspect of the present invention allows the production of particulate sodium bicarbonate out of sodium sesquicarbonate via a sodium carbonate—containing liquor. Sodium sesquicarbonate containing intrinsically both sodium carbonate and bicarbonate, this process valorizes in an optimum way the raw materials which are consumed.

Making a Sodium Carbonate—Containing Liquor

In the process for the production of sodium bicarbonate according to the invention, solid powder derived from sodium sesquicarbonate is dissolved in water. The expression "derived from sodium sesquicarbonate" means that the powder may consist essentially of sodium sesquicarbonate, but may also consist of a product which results from a direct transformation of sodium sesquicarbonate. For example, the transformation can be a calcination which transforms the sodium sesquicarbonate essentially in sodium carbonate. The sodium sesquicarbonate can have different origins. It can be produced artificially out of different sodium sources. However, it is recommended that sodium sesquicarbonate comes from a natural trona ore. In this recommended embodiment purification of the aqueous solution obtained after the dissolution of the solid powder in water will in general be necessary, in order to purify it from the main impurities contained in the ore. The purification generally involves settling and filtration steps, to allow insolubles to be removed from the aqueous solution. It may also involve generally the use of reagents in order to remove organic matters still contained in the purified aqueous solution. Activated carbon is an example of such reagent. In such instance, the purified aqueous solution having being subjected to settling and filtration may be passed through an activated carbon filter so as to remove some organics.

The water in which the solid powder derived from sodium sesquicarbonate is dissolved can be fresh water. However water has to be understood in a wide sense. The water can contain recycled water solutions already containing alkalis, coming from the process according to the invention or from other processes. The water can also comprise mother liquors (crystallization waters) produced downstream of the process according to the invention, when sodium carbonate and bicarbonate are crystallized, for instance. The process may also be suited when at least part of the water used to dissolve sodium sesquicarbonate is a mine water. By 'mine water' is understood the aqueous solution which is formed when water is directly injected into a trona ore deposit, whereby, on contact with the water, some ore dissolves in it. 'Mine water' is typically produced during what is generally known as 'solution mining'.

The mean particle diameter of the ore powder which is dissolved in the water preferably is between 0.1 and 10 mm. Powders having a mean diameter below 0.1 mm frequently contain too much impurities, for instance when the sodium sesquicarbonate is a trona ore, whereas powders having a mean diameter above 10 mm tend to be difficult to handle and dissolve in water. The mean diameter is the $D_{50}$ which is the diameter such that half of the particles, in weight, have a diameter lower than the specified value. For non spherical particles, the diameter is the equivalent one, that is six times the value of the volume of the particles divided by its external area.

The powder which derives from sodium sesquicarbonate can consist essentially of sodium sesquicarbonate and the impurities accompanying it, as in the embodiment wherein the source of sodium sesquicarbonate is natural trona ore.

In a recommended embodiment of the process according to the present invention, the powder derived from sodium sesquicarbonate is calcined sodium sesquicarbonate. In this embodiment, the sodium sesquicarbonate is first calcined, preferably at a temperature comprised between 100 and 400° C., before its dissolution in water. During calcination, the sodium sesquicarbonate in the trona ore breaks down into sodium carbonate, carbon dioxide and water. Also, calcination releases some of the organics associated with trona or trona shale.

The quantity of powder derived from sodium sesquicarbonate which is dissolved into water is regulated in order to obtain a resulting aqueous solution containing enough sodium carbonate and bicarbonate to allow smooth crystallization of both chemicals in the later stages of the process. It is recommended that the resulting aqueous solution contains at least 15%, preferably at least 20%, most preferably at least 25% by weight of sodium carbonate.

The crystallizer into which the resulting aqueous solution is introduced must be suitable to effect crystallization of sodium carbonate. The crystallized sodium carbonate may be in different hydration forms: monohydrate, decahydrate, heptahydrate, or may be anhydrous.

In a preferred embodiment of the process according to the present invention, the sodium carbonate crystals produced in the crystallizer are in the monohydrate form. The crystallizer is then part of what is commonly referred to as the "monohydrate crystallizer" in a "monohydrate process". In the monohydrate process, crushed trona ore is calcined at a temperature between 125° C. and 250° C. to convert sodium bicarbonate into sodium carbonate and form crude soda ash. The resulting crude sodium carbonate and the remaining organics are then dissolved in water. After dissolving the calcined trona, any undissolved solids (insolubles) are removed by at least one separation technique such as by settling, and the resulting solution is treated with activated carbon to remove some of the organics present in the solution. The solution may be then filtered. One of the advantages of the monohydrate process is that calcined trona dissolves faster than natural trona (sometimes called 'raw' trona). Another advantage is that calcined trona can produce more concentrated sodium carbonate solutions, whose concentrations can reach about 30%, while dissolved natural trona results into solutions having only about 16% sodium carbonate plus 10% sodium bicarbonate. The filtered solution containing sodium carbonate is then fed to an evaporative crystallizer where some of the water is evaporated and some of the sodium carbonate forms into sodium carbonate monohydrate crystals ($Na_2CO_3.H_2O$). A slurry (containing these monohydrate crystals and a mother liquor) is removed from the evaporators, and the crystals are separated from the mother liquor. The crystals are then calcined, or dried, to convert it to dense soda ash. The mother liquor may be recycled back to the evaporator circuit for further processing into sodium carbonate monohydrate crystals.

In the process according to the invention however, a portion of the mother liquor is purged from the sodium carbonate crystallizer (hence termed 'purge liquor') to prevent accumulation of trona derived impurities, such as NaCl, $Na_2SO_4$, silicates, and/or organics. This purge liquor or at least a portion thereof preferably serves as the feed to the sodium bicarbonate production process according to the present invention. The composition of the purge liquor which is put into contact with carbon dioxide to manufacture the sodium bicarbonate product can vary according to the crystallization conditions.

In general, it is recommended that the purge liquor contains a sufficient quantity of sodium carbonate.

Sodium Carbonate Liquor Feed to the Process

The feed liquor to the sodium bicarbonate production process is advantageously at least a portion of a purge stream from a monohydrate crystallizer, such purge stream being withdrawn from the crystallizer to maintain the concentration of impurities (such as chloride, sulfate, silicates, and/or TOC) in the crystallizer below a threshold value (to prevent their accumulation in the crystallizer).

In a recommended embodiment of the process for sodium bicarbonate production according to the invention, the purge liquor contains at least 175 g/kg, preferably at least 190 g/kg, more preferably at least 205 g/kg, most preferably at least 220 g/kg of sodium carbonate. It is however recommended that the purge liquor contains not more than 300 g/kg, preferably not more than 280 g/kg of sodium carbonate.

It is also recommended that the purge liquor contains not more than 35 g/kg, preferably contains not more than 30 g/kg, more preferably contains not more than 25 g/kg, most preferably contains not more than 20 g/kg of sodium bicarbonate.

It is additionally recommended that the purge liquor contains from 3 to 6, preferably from 4 to 5 equivalent/kg total alkali content. This means that one kg of mother solution contains advantageously from 3 to 6, preferably from 4 to 5 moles of ion $Na^+$, whether coming from sodium carbonate or sodium bicarbonate.

In an advantageous embodiment of the process for sodium bicarbonate production of the invention, the purge liquor contains at least 10 g/kg, preferably at least 15 g/kg, most preferably at least 20 g/kg of sodium chloride (NaCl). It is however recommended in those advantageous embodiments that the purge liquor contains not more than 60 g/kg of sodium chloride, preferably not more than 50 g/kg of sodium chloride, preferably not more than 40 g/kg of sodium chloride.

In another advantageous embodiment of the sodium bicarbonate production process of the invention, the purge liquor contains at least 1 g/kg, preferably at least 4 g/kg, more preferably at least 7 g/kg of sodium sulfate ($Na_2SO_4$), most preferably at least 8 g/kg of $Na_2SO_4$. It is however recommended in this advantageous embodiment that the purge liquor contains not more than 25 g/kg $Na_2SO_4$, more preferably contains not more than 20 g/kg $Na_2SO_4$.

In still another advantageous embodiment of the sodium bicarbonate production process of the invention, the purge liquor contains at least 0.5 g/kg of Si, preferably at least 0.6 g/kg of Si, most preferably at least 1 g/kg of Si (counted as silica). It is however recommended in this advantageous embodiment that the purge liquor contains not more than 3 g/kg of silica, preferably contains not more than 1.5 g/kg of silica.

In still yet another advantageous embodiment of the sodium bicarbonate production process of the invention, the purge liquor contains at least 100 ppm total organics carbon (TOC), preferably at least 200 ppm TOC, most preferably at least 400 ppm TOC. It is however recommended in those advantageous embodiments that the purge liquor should not exceed 1600 ppm in TOC content, preferably should not exceed 1500 ppm TOC.

A typical purge liquor would contain for example from 108 ppm TOC to 1480 ppm TOC, with an average around 450 ppm TOC; preferably from 300 to 1200 ppm TOC. The NaCl content of the purge liquor would be on average about 2% ranging from 0.3% to 3.6%. The $Na_2SO_4$ content of the purge liquor would be on average about 1.6% ranging from 0.1% to 3.2%. The Si content of the purge liquor would range from 500 ppm to 3000 ppm Si (measured as silica).

Making Sodium Bicarbonate Product

In the sodium bicarbonate production process according to the invention, an aqueous solution comprising sodium carbonate (preferably a sodium carbonate-containing liquor; more preferably at least a portion of a monohydrate purge liquor) is put into contact, in a gas-liquid reactor, with a feedgas comprising $CO_2$, in order to produce a water suspension comprising sodium bicarbonate crystals.

The sodium carbonate in the solution is preferably produced from calcined trona by the monohydrate process as described earlier.

The sodium bicarbonate production process preferably comprises:
 withdrawing a portion of the mother liquor out of the sodium carbonate crystallizer as a purge liquor; and
 putting at least a portion of the purge liquor into contact with the feedgas comprising carbon dioxide, in order to produce a second water suspension comprising sodium bicarbonate crystals;
 separating particles containing said sodium bicarbonate crystals; and
 drying said particles to form the sodium bicarbonate product.

The purge liquor which is put in contact with the $CO_2$-containing feedgas preferably contains organic impurities. The purge liquor may contain at least 100 ppm TOC, preferably at least 200 ppm TOC, most preferably at least 400 ppm TOC. It is however recommended in those advantageous embodiments that the purge liquor should not exceed 1600 ppm in TOC, preferably should not exceed 1500 ppm TOC.

The feedgas comprising carbon dioxide must react efficiently with the sodium carbonate-containing liquor in a gas-liquid reactor. To that end, it is recommended that the feedgas comprises at least 20% in weight, advantageously at least 40%, preferably at least 60%, more preferably at least 80% $CO_2$. It is particularly efficient to use pure (100%) $CO_2$. It is also recommended to use a well stirred gas-liquid reactor, comprising a gas injector able to distribute the feedgas homogeneously into the reactor. The liquid constitutes advantageously the continuous phase inside the reactor, the feedgas being injected at the bottom and moving upwards. The reactor preferably comprises cooling means, to counteract the exothermicity of the reaction of sodium carbonate with $CO_2$.

The $CO_2$ in the feedgas may have different origins. In one recommended embodiment, the $CO_2$ may originate from combustion of one or more hydrocarbonaceous material such as in a natural gas plant, after having been concentrated for example through an amine process. In the process for the production of the sodium bicarbonate product according to the invention, the gas comprising $CO_2$ may be produced by indirect calcination of a composition releasing $CO_2$ upon calcination, preferably a composition comprising an alkali bicarbonate, more preferably sesquicarbonate or trona. Preferably, the $CO_2$ in the feedgas comes from the monohydrate process which makes soda ash, for instance $CO_2$ generated in calciners used to calcine trona ore. Calcination of trona is advantageously operated between 140 and 180° C. By indirect calcination is meant calcination wherein the composition to be calcined is not in direct contact with the heat source utilized to warm the calciner. This is indeed the situation in conventional calciners, wherein the composition is in direct contact with the combustion gases produced by the burning fuel. In this embodiment, it is recommended to use steam heated calciners, wherein the steam is circulated into pipes, and the composition, preferably crushed trona ore, is heated by contact with the exterior surface of the pipes. The steam is advantageously produced by electricity and steam cogeneration. It has been observed that the gas comprising $CO_2$ which is produced in this way, after suitable drying for instance by a condensing step, has an elevated concentration in $CO_2$, typically more than 80% in volume, preferably more than 90%, most preferably more than 95%. The $CO_2$ has also a great purity. Thanks to those properties, a feedgas comprising $CO_2$ produced that way is especially suitable for the production of sodium bicarbonate out of an aqueous solution comprising sodium carbonate.

Consequently, the process for the production of sodium bicarbonate may further comprise a step in which a composition releasing $CO_2$ upon calcination is indirectly calcined in order to produce at least a portion of the feedgas comprising $CO_2$.

Alternatively or additionally, the process for the production of sodium bicarbonate may further comprise a step in which a hydrocarbonaceous composition releasing $CO_2$ upon combustion is burned to produce heat in order to produce at least a portion of the feedgas comprising $CO_2$.

The temperature inside the gas-liquid reactor may be between 60 and 85° C., or between 65 and 80° C. The temperature inside the gas-liquid reactor is preferably between 65 and 85° C., more preferably between 70 and 80° C. The temperature of the purge liquor when it is introduced into the reactor may be between 65 and 95° C. The temperature of the purge liquor is advantageously a little higher (e.g., at least 5° C. higher) than the reactor temperature, preferably between 80 and 95° C.

The operating pressure inside the gas-liquid reactor may be from atmospheric pressure up to 90 psia (from 101 to 9,120 kPa). It is preferable for the operating pressure to be at least slightly above atmospheric pressure, such as between 1.02 and 2 atmospheres (between 15 and 29.4 psia; or between 103 and 203 kPa). The operating pressure is more preferably between 17 psia and 27 psia (between 117 and 186 kPa).

In order to obtain a water suspension comprising enough sodium bicarbonate crystals, it is preferable to maintain a residence time in the gas-liquid reactor greater than 10 minutes, more preferably greater than 20 minutes. Generally, the liquid residence time may be from 60 to 600 min, preferably from 120 to 420 minutes, more preferably from 180 to 360 minutes.

In some embodiments, a crystallization-modifying agent may be added to the sodium carbonate-containing aqueous solution to be fed to the gas-liquid reactor or may be added directly to the gas-liquid reactor. When a crystallization-modifying agent is used, it preferably contains Ca and/or Mg.

The formation of the sodium bicarbonate crystals preferably takes place in the presence of an added alkaline earth metal salt. An alkaline earth-containing salt, such as containing Ca and/or Mg, may be added to the purge liquor fed to the gas-liquid reactor or may be added directly to the gas-liquid reactor while the purge liquor is separately fed to the reactor. A preferred Ca-containing salt to be used as crystallization-modifying agent is calcium chloride. An aqueous solution of calcium chloride is preferred, such as a 30% by weight calcium chloride aqueous solution. Calcium may be used during the formation of crystalline sodium bicarbonate so as to reach an amount from 30 to 200 mg Ca per kg of sodium bicarbonate particles produced, preferably from 50 to 180 mg Ca per kg sodium bicarbonate particles produced, more preferably from 70 to 110 mg Ca per kg sodium bicarbonate particles produced. The addition of Ca may be carried to change the mean particle size, in that the greater the amount of Ca in the (second) suspension in the gas-liquid reactor, the greater the particle size of sodium bicarbonate.

In some embodiments, the process excludes adding exogeneous magnesium to the aqueous solution containing sodium carbonate or to the (second) suspension in the gas-liquid reactor. A content of Mg in the aqueous solution containing sodium carbonate or to the (second) suspension of less than 15 ppm is preferred.

The (second) water suspension produced into the gas liquid reactor is subjected to a separation. The separation of crystalline sodium bicarbonate particles from the suspension can be carried out by any appropriate mechanical separating means, for example by settling, by centrifugation, by filtration or by a combination of these separating means.

The crystalline sodium bicarbonate particles are finally dried to form the particulate sodium bicarbonate product. The final particulate sodium bicarbonate product may be packed into bags or sacks and/or may be loaded into railcars.

In preferred embodiments of this process, the solution comprising sodium carbonate comprises preferably at least 175 g/kg of sodium carbonate, and the gas comprising $CO_2$ comprises at least 90% $CO_2$.

Other preferred embodiments of the process for the production of sodium bicarbonate crystals described above are also advantageously adapted to a process for the joint production of sodium carbonate and sodium bicarbonate crystals.

In some embodiments, the final particulate sodium bicarbonate product may not be subjected to sieving in order to remove fines (e.g., particles of less than 45 microns) and/or to remove large particles (e.g., particles of more than 300 microns).

In additional or alternate embodiments, the final particulate sodium bicarbonate product may not be subjected to a grinding or milling operation which would impact its particle size distribution and/or particle shape.

Figure 1:
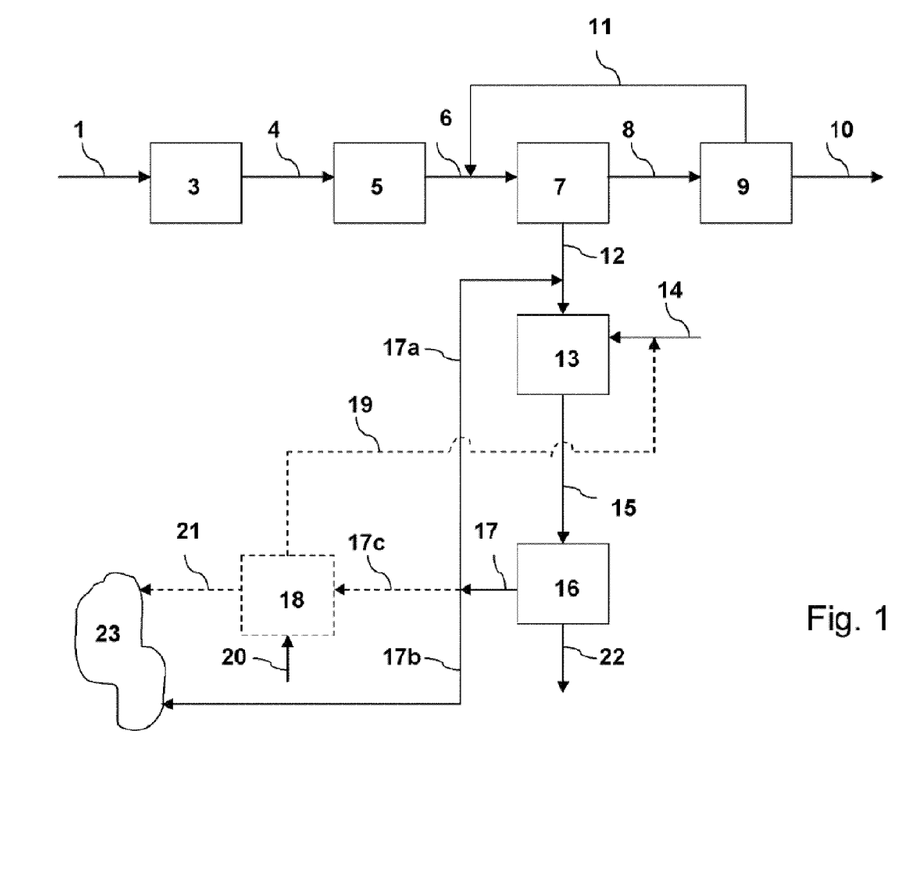
FIG. 1 illustrates a process flow diagram of a process according to an embodiment of the present invention.

FIG. 1 illustrates a particular embodiment of the invention. Crushed sodium carbonate crystals 1, originating from calcined trona ore, and water 2 (or an aqueous medium) are introduced in a leaching tank 3. The resulting aqueous solution 4, containing insolubles in suspension, is purified in a purification unit 5, which may include one or more settling units, one or more thickeners, and/or one or more filtrations units. A purified aqueous solution 6 is introduced into a monohydrate crystallizer 7, wherein a suspension 8 containing sodium carbonate monohydrate crystals is produced. Those crystals 10 are separated from the suspension in a separator 9. The resulting mother liquor 11 exiting the separator 9 is sent back to the crystallizer 7. A purge stream 12 withdrawn from the crystallizer 7 is carbonated in a reactor 13 which is fed by a carbon dioxide-containing feedgas 14. An (second) aqueous suspension 15 comprising crystalline sodium bicarbonate particles is extracted from the reactor 13. The sodium bicarbonate particles 22 are finally separated in a separation unit 16 (preferably one or more centrifuges, one or more filters, or any combinations thereof) and dried in a drying unit (not shown). A second mother liquor 17 generated in the reactor 13 exits the separation unit 16. A portion 17a of the second mother liquor 17 is added to the purge stream 12 or fed directly to reactor 13 (not illustrated) for recycle to the reactor 13. Another portion 17b of the second mother liquor 17 may be sent to a storage pond 23. Additionally or alternatively, a portion 17c of the second mother liquor 17 may be debicarbonated with vapor 20 in debicarbonation unit 18 before it may be sent via stream 21 to a storage pond (which may be the same as pond 23 as illustrated in FIG. 1 or may be a different pond than pond 23—not illustrated). Carbon dioxide 19 which would be obtained from debicarbonation and which would exit the debicarbonation unit 18 may be advantageously recycled to the reactor 13.

Particulate Sodium Bicarbonate Product

The sodium bicarbonate production process according to the invention allows to directly produce a low-cost fairly-pure crystalline sodium bicarbonate out of one or more quite-impure liquors. The crystalline sodium bicarbonate however does contain within its polycrystalline structure a certain amount of impurities. Applicants have surprisingly found that the presence of such impurities in its polycrystalline structure provides at least one of the following advantages to the resulting product:
1. excellent flowability of the product in form of powder,
2. smoother particle surface (e.g., with much less spikes or long thin needled and smoother surface landscape),
3. more regular granulation into ovoid or spherical shaped particles (e.g., with very few sharp angles and/or mean axial ratio of at least 0.7, preferably approaching 0.9 to 1), and/or
4. a narrow particle size distribution.

In those advantageous embodiments, it has been observed that the produced sodium bicarbonate crystals contain much less impurities than the mother liquor. It is advantageous that the crystalline sodium bicarbonate product contains less than 1.5 g/kg $Na_2SO_4$ and/or less than 1.5 g/kg NaCl.

The crystalline sodium bicarbonate particles preferably contain less than 0.5 g/kg Si or 500 ppm Si (measured as silica).

The crystalline sodium bicarbonate particles preferably contain 500 ppm Total Organic Carbon or less.

However it has been found that the produced sodium bicarbonate product preferably contains some of these impurities within its polycrystalline structure to confer one or more specific advantageous characteristics and/or properties, as described above.

In preferred embodiments, the crystalline sodium bicarbonate product may contain more than 0.3 g/kg $Na_2SO_4$ and/or more than 0.3 g/kg NaCl. A preferred range for NaCl content is from 0.6 to 2 g NaCl per kg of total weight (or 0.06-0.2 wt %); from 0.6 to 1.2 g NaCl per kg of total weight (or 0.06-0.12 wt %) being more preferred. A preferred range for $Na_2SO_4$ content is from 0.4 to 2.2 g $Na_2SO_4$ per kg of total weight (or 0.04-0.22 wt %); from 0.4 to 1.3 g $Na_2SO_4$ per kg of total weight (or 0.04-0.13 wt %) being more preferred.

The produced sodium bicarbonate product preferably contains organic impurities within its polycrystalline structure. The sodium bicarbonate product may contain at least 75 ppm of Total Organic Carbon (TOC); preferably at least 80 ppm TOC; more preferably at least 100 ppm TOC; yet more preferably at least 110 ppm TOC; most preferably at least 120 ppm TOC. Although more than 500 ppm TOC may be present in the final product, it is preferred that the sodium bicarbonate product contains at most 500 ppm TOC; more preferably at most 400 ppm TOC. A most preferred range of total organic content inside the polycrystalline structure of the sodium bicarbonate product may be more than 100 ppm TOC and at most 350 ppm TOC, or more than 120 ppm TOC and at most 400 ppm TOC.

The sodium bicarbonate product preferably also contains some inorganic impurities within its polycrystalline structure. The sodium bicarbonate product may contain magnesium in an amount of at most 18 ppm, or at most 15 ppm, or at most 12 ppm. Values of magnesium content in the sodium bicarbonate product may be at least 1 ppm, or at least 3 ppm, or at least 4 ppm. A preferred range of Mg content inside the polycrystalline structure of the sodium bicarbonate product may be from 4 to 18 ppm Mg or from 4 to 12 ppm Mg. A Mg content in the particulate sodium bicarbonate product ranging from 7 to 18 ppm is also suitable.

The sodium bicarbonate product may contain calcium in an amount of at least 30 ppm Ca; or at least 50 ppm Ca; or at least 60 ppm Ca, or at least 70 ppm Ca. Values of calcium content in the sodium bicarbonate product may be at most 200 ppm Ca, or at most 180 ppm Ca, or at most 150 ppm Ca, or at most 125 ppm Ca, or at most 115 ppm Ca. Preferred ranges of Ca content inside the polycrystalline structure of the sodium bicarbonate product may be from 30 to 200 ppm Ca; or from 50 to 180 ppm Ca; or from 70 to 110 ppm Ca.

The sodium bicarbonate product may contain silicon in the form of silica and/or silicates in an amount of at least 100 ppm Si (measured as silica), or at least 125 ppm Si (measured as silica), or at least 150 ppm Si (measured as silica). Values of Si content inside the polycrystalline structure of the sodium bicarbonate product may be less than 500 ppm Si, or at most 450 ppm Si, or at most 425 ppm Si. A preferred range of Si content inside the polycrystalline structure of the sodium bicarbonate product may be from 125 to 400 ppm Si (measured as silica).

In preferred embodiments, the crystalline sodium bicarbonate product may contain sodium carbonate, generally in a low amount up to 2% by weight, preferably 1% or less. A typical range of sodium carbonate content in the crystalline sodium bicarbonate product may be between 0.2 and 0.7% by weight.

The sodium bicarbonate product is preferably free of a flow aid additive. For example, the sodium bicarbonate product may be free of an alkaline earth phosphorous-containing flow aid agent (such as tricalcium phosphate) and/or may be free of a silica-based flow aid agent such as hydrophobic silica, silica gel, or nanosized silica.

The sodium bicarbonate product may contain optional ingredients such as about 0.1-5 weight percent of an anti-caking agent or desiccant, based on the weight of sodium bicarbonate. Examples of anti-caking agents may be magnesium silicate, calcium silicate, a stearate, bentonite, magnesium phosphate, and the like. Examples of desiccants may be activated alumina, calcium chloride, zinc chloride, dehydrated borax, and the like. In alternate embodiments, the sodium bicarbonate product may be free of an anti-caking agent or desiccant.

In preferred embodiments, the sodium bicarbonate product does not contain another particulate inorganic compound with which it is blended. For example, the sodium bicarbonate product should not contain discrete and separate particles of silica and/or silicates in the sodium bicarbonate product. That is to say, the sodium bicarbonate product consists of a single population of particles, each particle containing more than 98% $NaHCO_3$.

Because of the presence of valuable impurities in this product though, the sodium bicarbonate particles may comprise less than 99.5% $NaHCO_3$.

The process according to the invention is particularly effective to produce a crystalline sodium bicarbonate product comprising poly-crystalline particles with a median diameter ($D_{50}$) of less than 300 microns. The mean diameter is preferably 275 microns or less, or 260 microns or less, or even 250 microns or less. The mean diameter may be at least 75 microns, or at least 100 microns, or at least 125 microns. The mean diameter being defined as $D_{50}$ which is the diameter such that half of the particles, in weight, have a diameter lower than the specified value. The mean diameter of the sodium bicarbonate product may be between 75 and 250 μm, preferably between 80 and 150 μm. $D_{10}$ diameters are preferably between 40 and 100 μm, whereas $D_{90}$ diameters are preferably between 175 and 500 μm. In a variant of such embodiment in which $D_X$ is the diameter value such that x percent of the particles have a diameter lower than the value. When the particles have an approximately spherical shape, the diameter is the diameter of the particle. For irregular shapes such as non spherical particles, the diameter is six times the volume of the particle divided by its outer surface (external area).

The optimum mean diameter of the particles forming the sodium bicarbonate product depends on the use for which it is intended. Accordingly, a particulate sodium bicarbonate product which is very suitable in the majority of applications in the present invention may have a mean particle diameter $D_{50}$ of between 80 and 300 microns, or between 100 and 250 microns, or between 120 and 240 microns. Preferred narrower ranges for $D_{50}$ may be from 130 to 190 microns, or even from 200 to 240 microns.

In a variant of such embodiment in which $D_X$ is the diameter value such that x percent of the particles have a diameter lower than the value, the particulate sodium bicarbonate product may have a $D_{10}$ diameter between 25 and 100 microns, preferably between 40 and 100 µm. Additionally or alternatively, the particulate sodium bicarbonate product may have a $D_{90}$ diameter between 175 and 500 µm, preferably between 250 and 450 µm.

The produced sodium bicarbonate is preferably in the form of a particulate powder but may contain a small weight fraction of fines, that is to say, of particles of less than 45 microns, such as those passing a size of U.S. mesh size of 325 (44 microns). In particular, preferably less than 10% by weight, more preferably less than 8% by weight, most preferably less than 5% by weight of the particles in the sodium bicarbonate product have a size of less than 45 microns (e.g., passing through a US mesh size of 325). Additionally or alternatively, preferably 8% by weight or less, more preferably 6% by weight or less, most preferably 5% by weight or less of particles in the particulate sodium bicarbonate product have a size of 37 microns or less (e.g., passing through a US mesh size of 400).

The sodium bicarbonate crystals produced by the process according to the invention have a very special structure: they contain impurities at a particular, however low, level. This level is higher than that of conventional sodium bicarbonate crystals for instance produced out of commercial sodium carbonate. Those impurities are a kind of memory in the bicarbonate crystals of the composition of the mother liquor. The usefulness of those impurities has been observed, and it is suspected that some of their concentration corresponds to the level of some additives. Positive impact on storage of powders of such crystalline sodium bicarbonate product is expected. Positive impact on flowability of such crystalline sodium bicarbonate product has been observed. The crystalline particles have also a unique granulometry and/or surface property. Moreover, they are extremely advantageous for many applications, in which cost of production is a major factor.

One embodiment relates to a particulate sodium bicarbonate product with an excellent flowability which is characterized by a low angle of repose, e.g., less than 30 degrees. The angle of repose is preferably 29 degrees or less, or 28 degrees or less, or 28.5 degrees or less, or even 27.5 degrees or less.

The particulate sodium bicarbonate product may have an angle of repose of 15 or more, preferably an angle of repose of 18 or more.

An angle of repose between 19 and 27.5 degrees has been measured for sodium bicarbonate powders according to the present invention with mean diameter $D_{50}$ ranging from 85 microns to 215 microns.

Another embodiment relates to a sodium bicarbonate product of new morphology in the form of ovoid or spherical particles, which differs from the known sodium bicarbonate products, in that the present sodium bicarbonate product is not formed from particles of larger size, such as by grinding and/or milling, and/or in that the present sodium bicarbonate product is not formed by removing fines and/or particles of large size, such as by sieving.

Within the framework of the invention, the ovoid or spherical particles are particles which have an essentially curved surface free from sharp edges. They generally have a rotation profile which can vary from a lens to an ideal sphere. According to such embodiment, a sodium bicarbonate product according to the present invention is in the form of ovoid particles having a mean axial ratio of at least 0.5, preferably greater than 0.7, more preferably greater than 0.8, the mean axial ratio being defined by the relationship:

$$\frac{\sum_{i=1}^{i=n} a_i : b_i}{n}$$

where $a_i$ and $b_i$ respectively denote the smallest and the largest axial dimension of a particle, n denotes the number of particles in a representative sample of particles of sodium bicarbonate. A mean axial ratio of between 0.75 and 0.98 or between 0.8 and 0.95 is particularly preferred. Approximately spherical particles are most preferred.

The ovoid or spherical particles are preferably monolithic. Monolithic particle is understood to denote a particle formed from a non-agglomerated unit block of sodium bicarbonate. According to the present invention, the monolithic particles are advantageously crystalline. Each particle is preferably a polycrystal.

According to yet another embodiment of the invention, the sodium bicarbonate product has a smooth particle surface, that is to say, less than 75% of the particle surface, preferably less than 50% of the particle surface, is covered with spikes.

Reagent Powder and its Use in Removing Pollutants from Gas

Another aspect of the present invention concerns also a reagent powder comprising or consisting essentially of the crystalline sodium bicarbonate product according to the invention. The crystalline sodium bicarbonate product in the reagent powder is preferably obtained by the process according to the invention.

Such reagent powders are particularly suited for the removal of pollutants from gases.

Consequently, the invention concerns also a process for treating a gas containing acid gas pollutants, preferably HCl and/or $SO_x$ according to which a reagent powder according to the invention is injected in the gas, the pollutants react with the reagent, and the product of the reaction is separated from the gas. The injection is preferably taking place in a duct inside which the gas flows. The separation of the products of the reaction can most simply be performed by filtration, using bag filters or electrostatic precipitators. In this process, it is recommended that the temperature of the gas is above 100° C., preferably above 110° C., more preferably above 120° C., most preferably above 130° C. At those temperatures, the sodium bicarbonate quickly decomposes into sodium carbonate having a high specific surface and thus high reactivity. The decomposition occurs within seconds upon exposure to such temperature, for example in the gas treatment duct. The reagent may be injected in the dry or semidry state. By 'semidry state injection' is understood to mean an injection of fine droplets of a water solution or preferably suspension of the reagent into a hot gas, having a temperature above 100° C. The solution or suspension evaporates immediately after its contact with the hot gas.

A suitable example for an application using such sodium bicarbonate product in the purification of a gas containing hydrogen chloride (such as flue gas from the incineration of household waste) may be found in U.S. Pat. No. 6,171,567 (by Fagiolini).

Another suitable example for an application using such sodium bicarbonate product in cleaning a gas containing sulfur dioxide and nitrogen monoxide (for example, fumes generated by the combustion of sulfur-containing fossil fuels, in electricity-producing power stations) may be found in U.S. Pat. No. 5,540,902 (by De Soete).

EXAMPLES

Details and particularities of the invention will appear from the description of the following examples.

Example 1

Crushed trona ore originating from Wyoming was used as feed material in a monohydrate process for the production of sodium carbonate. Accordingly, the crushed trona ore was calcined at a temperature of 170° C. The resulting sodium carbonate was leached in a quantity regulated in order to get a water solution containing 30% (weight) of sodium carbonate. The resulting water solution was then filtered, purified and introduced into a crystallizer, according to the monohydrate process. A first water suspension comprising sodium carbonate monohydrate crystals was produced in the crystallizer. The suspension was submitted to a separation, resulting in sodium carbonate monohydrate crystals (which were further processed into dense anhydrous sodium carbonate crystals) on one side and a (first) mother liquor on the other side. Part of the mother liquor was then taken out of the crystallizer, as part of a purge. The composition of the purge (mother) liquor is given in TABLE 1. The mother liquor was stored in a tank and heated at 87° C. This mother liquor was introduced from the tank into a gas-liquid reactor. The reactor was agitated and maintained at 70° C. A carbon dioxide gas stream (100% $CO_2$), saturated at about 40° C. was introduced into the reactor at a pressure of approximately 10 psig (170 kPa). A 30 wt % solution of calcium chloride was added to the reactor in an amount sufficient to obtain about 70 to 80 ppm Ca in the resulting sodium bicarbonate product and to obtain a mean particle size of about 160-170 microns. Liquid residence time into the reactor was approximately 340 minutes. A second water suspension comprising sodium bicarbonate crystals was produced and extracted from the bottom of the reactor. The crystalline products were separated from the suspension and dried. Size and composition of the sodium bicarbonate products obtained over the course of five months (runs No. 1 to 5) are given in TABLE 2.

Different grab samples were used to measure the angle of repose. A sample with a $D_{50}$ of 85 microns had an angle of repose of 25. Another sample with a $D_{50}$ of 235 microns had an angle of repose of 19.

The method for the angle of repose measurement was as follows:
  Measure 100 mls of sample to be tested.
  Determine the sample weight to 0.1 g.
  Cover the bottom of a funnel with an orifice with inside diameter of 1.5 cm, and transfer sample into funnel.
  Remove cover and let the sample flow freely onto a large piece of paper.
  Place a mark on the paper at opposite edges of the pile to determine the diameter (D) of the pile.
  Measure the height (H) of the pile.
  Calculate the angle of repose α by using tang (α)=2 H/D.

TABLE 1

Average composition of Purge liquor for Runs 1 to 5

| | units | Run 1 | Run 2 | Run 3 | Run 4 | Run 5 |
|---|---|---|---|---|---|---|
| $Na_2CO_3$ | % | na* | 26.34 | na* | 26.41 | 26.06 |
| $NaHCO_3$ | % | | 2.09 | | 1.87 | 1.80 |
| $Na_2SO_4$ | g/kg | | 1.66 | | 1.59 | 1.93 |
| NaCl | g/kg | | 2.28 | | 2.01 | 2.00 |
| Specific Gravity | — | | 1.320 | | 1.323 | 1.318 |
| Si | ppm | | na* | | na* | 1078 to 1398 |
| Ca | ppm | | na* | | na* | 2 to 3 |
| Mg | ppm | | na* | | na* | 2 to 17 |
| Fe | ppm | | na* | | na* | 0.4 to 0.8 |
| Al | ppm | | na* | | na* | 2 | na*: not available

TABLE 2

Average composition of sodium bicarbonate products

| | units | Run 1 | Run 2 | Run 3 | Run 4 | Run 5 |
|---|---|---|---|---|---|---|
| $NaHCO_3$ | % | 98.42 | 98.48 | 99.06 | 98.87 | 98.98 |
| $Na_2CO_3$ | % | 0.64 | 0.66 | 0.31 | 0.35 | 0.37 |
| NaCl | g/kg | 1 | 1.2 | 1 | 1.1 | 1.1 |
| $Na_2SO_4$ | g/kg | 1.1 | 0.8 | 1.1 | 1.3 | 1.2 |
| Ca | ppm | 73 | 80 | 77 | 68 | 83 |
| Mg | ppm | 8 | 5 | 4 | 8 | 11 |
| Fe | ppm | 1.3 | 1.1 | 1.2 | 0.8 | 1.1 |
| Al | ppm | 2 | 1 | 2 | 2 | 2 |
| Si | ppm | 397 | 306 | 218 | 242 | 213 |
| Si | g/kg | 0.397 | 0.306 | 0.218 | 0.242 | 0.213 |
| $D_{10}$ | μm | 37 | 43 | 37 | 36 | 35 |
| $D_{50}$ | μm | 161 | 186 | 153 | 174 | 178 |
| $D_{90}$ | μm | 361 | 395 | 414 | 441 | 430 |
| insol. | % | 0.4 | 0.4 | 0.29 | 0.5 | 0.34 |
| TOC ppm | ppm | na* | na* | 181 | na* | 260 | na*: not available

Example 2

In Example 2, it was processed as in Example 1, except that more of the solution of calcium chloride was added to the reactor in an amount sufficient to obtain about 90 to 100 ppm Ca in the resulting sodium bicarbonate product and to obtain a mean particle size of about 210-230 microns. It was estimated that about 170 mg Ca per kg of sodium bicarbonate produced was used. Size and composition of the sodium bicarbonate products obtained over the course of next months (runs No. 6 to 11) are given in TABLE 4. The TOC values were measured on samples at the exit of the drying unit. The remainder of the data was measured on samples after loading. The average composition of the purge (mother) liquor fed to the gas-liquid reactor is given in TABLE 3.

TABLE 3

Average Composition of Purge liquor for Runs 6 to 11

|  | units | Run 6 | Run 7 | Run 8 | Run 9 | Run 10 | Run 11 |
|---|---|---|---|---|---|---|---|
| $Na_2CO_3$ | % | 26.62 | 26.92 | 27.17 | 27.14 | 26.09 | 27.75 |
| $NaHCO_3$ | % | 1.78 | 1.58 | 1.69 | 1.83 | 1.63 | 0.87 |
| $Na_2SO_4$ | g/kg | 1.61 | 0.91 | 0.86 | 1.27 | 1.35 | 0.77 |
| NaCl | g/kg | 1.85 | 1.50 | 1.48 | 1.57 | 2.05 | 1.50 |
| Specific Gravity | — | 1.324 | 1.323 | 1.322 | 1.328 | 1.323 | 1.321 |

TABLE 4

Average Composition of sodium bicarbonate products

|  | units | Run 6 | Run 7 | Run 8 | Run 9 | Run 10 | Run 11 |
|---|---|---|---|---|---|---|---|
| $NaHCO_3$ | % | 99.06 | 99.01 | 99.00 | 98.89 | 99.06 | 98.95 |
| $Na_2CO_3$ | % | 0.29 | 0.30 | 0.30 | 0.28 | 0.22 | 0.34 |
| NaCl | g/kg | 1.2 | 0.9 | 0.9 | 0.9 | 0.7 | 1 |
| $Na_2SO_4$ | g/kg | 1.3 | 0.9 | 0.7 | 0.9 | 0.9 | 0.6 |
| Ca | ppm | 75 | 86 | 98 | 103 | 105 | 84 |
| Mg | ppm | 10 | 12 | 8 | 9 | 10 | 8 |
| Fe | ppm | 0.9 | 1.4 | 1.3 | 2 | 1.3 | 1.5 |
| Al | ppm | 2 | 4 | 3 | 2 | 2 | 2 |
| Si | ppm | 206 | 309 | 298 | 247 | 215 | 259 |
| Si | g/kg | 0.206 | 0.309 | 0.298 | 0.247 | 0.215 | 0.259 |
| $D_{10}$ | μm | 52 | 81 | 68 | 72 | 62 | 58 |
| $D_{50}$ | μm | 210 | 230 | 230 | 234 | 211 | 225 |
| $D_{90}$ | μm | 442 | 447 | 452 | 469 | 408 | 466 |
| insol. | % | 0.34 | 0.37 | 0.53 | 0.61 | 0.41 | 0.44 |
| TOC | ppm | 176 | 210 | 343 | 236 | 154 | 151 |

A grab sample during Run 10 was used to measure the angle of repose. A sample with a $D_{50}$ of 215 microns ($D_{10}$ of 75 microns; $D_{90}$ of 400 microns) had an angle of repose of 24.7. This sodium bicarbonate sample also had a low weight fraction (5.7%) of particles of size less than 45 microns.

Particle size distribution was also determined for this sample, and the data is provided in TABLE 5.

TABLE 5

| Size range | % | Size range | Cumulative % passing |
|---|---|---|---|
| +600 microns | 0.0 | +600 microns | 0.0 |
| −600 + 425 microns | 7.5 | +425 microns | 7.5 |
| −425 + 300 microns | 18.8 | +300 microns | 26.4 |
| −300 + 212 microns | 24.6 | +212 microns | 51.0 |
| −212 + 150 microns | 20.8 | +150 microns | 71.8 |
| −150 + 106 microns | 12.4 | +106 microns | 84.2 |
| −106 + 75 microns | 5.9 | +75 microns | 90.0 |
| −75 + 53 microns | 3.1 | +53 microns | 93.2 |
| −53 + 45 microns | 1.1 | +45 microns | 94.3 |
| −45 + 38 microns | 1.0 | +38 microns | 95.3 |
| −38 + 32 microns | 0.9 | +32 microns | 96.2 |
| −32 + 25 microns | 1.0 | +25 microns | 97.2 |
| −25 + 20 microns | 0.7 | +20 microns | 97.9 |
| −20 + 15 microns | 0.6 | +15 microns | 98.5 |
| −15 + 10 microns | 0.5 | +10 microns | 99.0 |
| −10 + 5 microns | 0.7 | +5 microns | 99.7 |
| −5 + 2 microns | 0.3 | +2 microns | 100.0 |
| −2 + 1 microns | 0.0 | +1 microns | 100.0 |
| −1 microns | 0.0 |  |  |

Figure 2A:
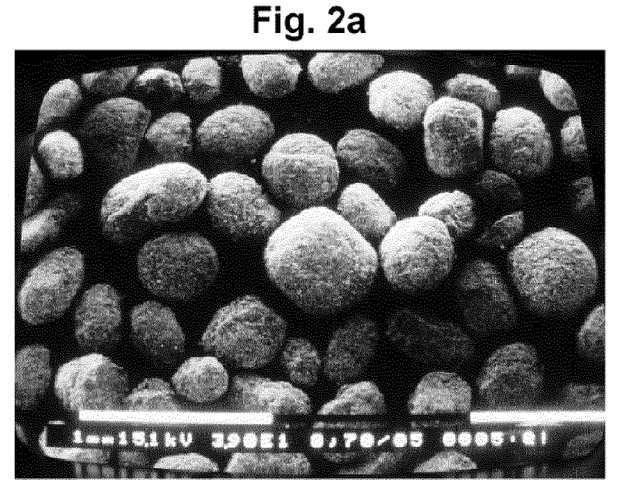
FIGS. 2a and 2b are SEM photographs, enlarged 39× and 5000× respectively, of ovoid-shaped particles of the sodium bicarbonate product according to an embodiment of the present invention.
Figure 2B:
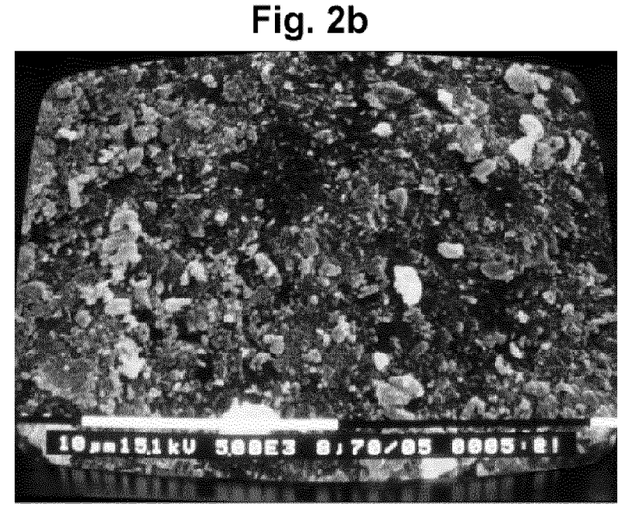

SEM photographs were also taken of this sample. FIG. 2a and FIG. 2b represent SEM photographs, enlarged 39× and 5000× respectively, of ovoid-shaped (almost spherical) particles of sodium bicarbonate product according to the present invention. As shown in FIG. 2b, the surface of the ovoid-shaped particles were free of spikes.

Figure 3A:
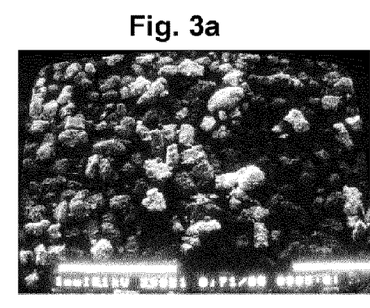
FIGS. 3a and 3b are SEM photographs, enlarged 39× and 5000× respectively, of a commercially available sodium bicarbonate product not according to the present invention.
Figure 3B:
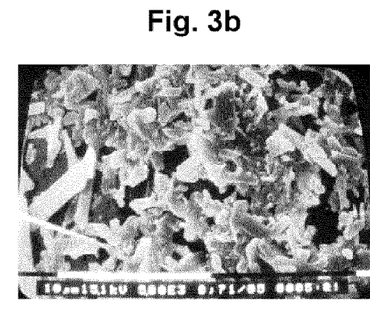
Figure 4A:
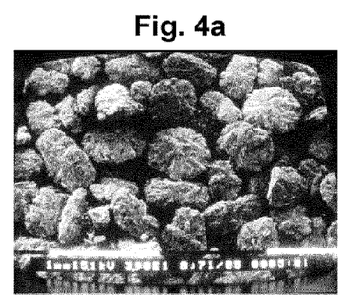
FIGS. 4a and 4b are SEM photographs, enlarged 39× and 5000× respectively, of another commercially available sodium bicarbonate product not according to the present invention.
Figure 4B:
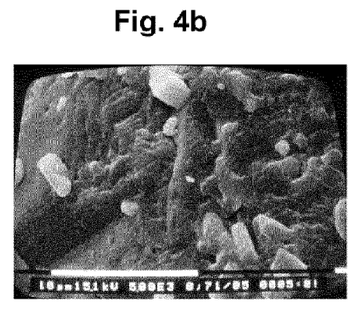

SEM analysis of two commercially-available sodium bicarbonate products was also done for comparison. FIG. 3a and FIG. 3b represent SEM photographs, enlarged 39× and 5000× respectively, of non-ovoid sodium bicarbonate particles (D50 of 154 microns; containing 61 ppm TOC and 4 ppm Si) with a spiky surface. FIG. 4a and FIG. 4b represent SEM photographs, enlarged 39× and 5000× respectively, of non-ovoid sodium bicarbonate particles (D50 of 261 microns; containing 56 ppm TOC and 2 ppm Si) which comprised rods on their surface.

The purge liquor typically contains from 108 ppm TOC to 1480 ppm TOC, with an average around 450 ppm TOC; preferably contains from 300 to 1200 ppm TOC. The NaCl content of the purge liquor is on average about 2% ranging from 0.3% to 3.6%. The $Na_2SO_4$ content of the purge liquor is on average about 1.6% ranging from 0.1% to 3.2%. The Si content of the purge liquor ranges from 500 ppm to 3000 ppm.

This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

The use of the singular herein includes the plural (and vice versa) unless specifically stated otherwise.

In addition, where the use of the term "about" is before a quantitative value, the present teachings also include the specific quantitative value itself, unless specifically stated otherwise. As used herein, the term "about" refers to a +−10% variation from the nominal value.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

The invention claimed is:

1. A particulate sodium bicarbonate product with an excellent flowability characterized by an angle of repose less than 30 degrees, being in the form of particles containing at least 75 ppm of Total Organic Carbon (TOC), wherein the particles contain from 100 ppm Si (measured as silica) to less than 500 ppm Si.

2. The product according to claim 1, wherein the angle of repose is 29 degrees or less.

3. The product according to claim 1, wherein the angle of repose is less than 27.5 degrees.

4. The product according to claim 1, being in the form of ovoid or spherical particles.

5. The product according to claim 1, wherein the sodium bicarbonate particles have a smooth particle surface in which less than 75% of the particle surface is covered with spikes.

6. The product according to claim 1, wherein the particles have a mean diameter $D_{50}$ of less than 300 microns and a mean diameter $D_{50}$ of at least 75 microns.

7. The product according to claim 1, wherein the mean particle diameter $D_{50}$ is between 80 and 300 microns.

8. The product according to claim 1, wherein the particles have a $D_{10}$ size between 25 and 100 microns, and a $D_{90}$ size between 175 and 500 μm.

9. The product according to claim 1, wherein less than 10% by weight of the particles in the sodium bicarbonate product have a size of less than 45 microns.

10. The product according to claim 1, wherein the particles contain at least 100 ppm of Total Organic Carbon (TOC).

11. The product according to claim 1, wherein the particles contain at most 500 ppm of Total Organic Carbon (TOC).

12. The product according to claim 1, wherein the particles contain from 4 to 18 ppm Mg; or from 30 to 200 ppm Ca.

13. The product according to claim 1, wherein the particles contain more than 0.3 g/kg NaCl.

14. The product according to claim 1, being free of a flow aid additive.

15. A process for producing the particulate sodium bicarbonate product according to claim 1, comprising:
- dissolving a solid powder derived from sodium sesquicarbonate, preferably having a mean particle diameter comprised between 0.1 and 10 mm in water to form an aqueous solution;
- introducing the resulting aqueous solution into a crystallizer, wherein a first water suspension comprising sodium carbonate crystals is produced;
- subjecting the first water suspension to a separation, in order to obtain crystals comprising sodium carbonate on the one hand and a mother liquor on the other hand;
- taking a part of the mother liquor out of the crystallizer as a purge liquor containing between 100 ppm TOC and 1600 ppm TOC; and
- putting at least a portion of said purge liquor into contact with a gas comprising carbon dioxide in the presence of an added alkaline earth metal salt, in order to produce a second water suspension comprising sodium bicarbonate crystals;
- separating particles containing said sodium bicarbonate crystals; and
- drying said particles to form said sodium bicarbonate product.

16. The process according to claim 15, wherein the sodium bicarbonate product is not subjected to a sieving operation which would impact its granulation.

17. The process according to claim 15, wherein the sodium bicarbonate product is not subjected to a grinding or milling operation which would impact its granulation.

18. The process according to claim 15, wherein the added alkaline earth metal salt comprises Ca, and wherein calcium is added to reach an amount from 30 mg to 200 mg Ca per kg of sodium bicarbonate particles produced.

19. The product according to claim 1, being free of an anti-caking agent or dessicant.

* * * * *